(No Model.) 2 Sheets—Sheet 1.
E. T. THOMAS.
SEWING MACHINE.
No. 277,084. Patented May 8, 1883.
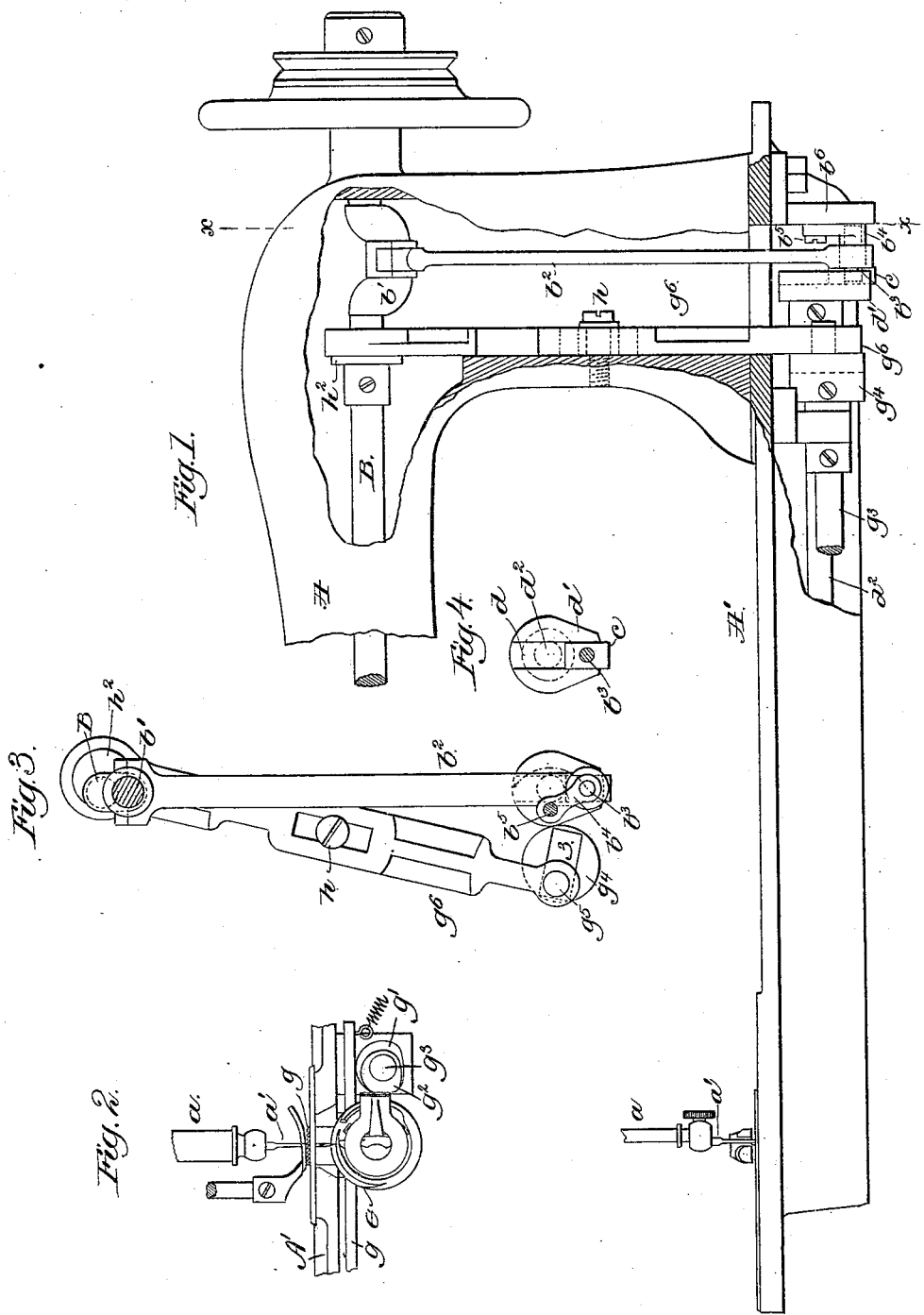
Witnesses.
John F. C. Prinkert
Fred A. Powell
Inventor
Eady T. Thomas
by Crosby & Gregory
Attys.

(No Model.) 2 Sheets—Sheet 2.
E. T. THOMAS.
SEWING MACHINE.
No. 277,084. Patented May 8, 1883.
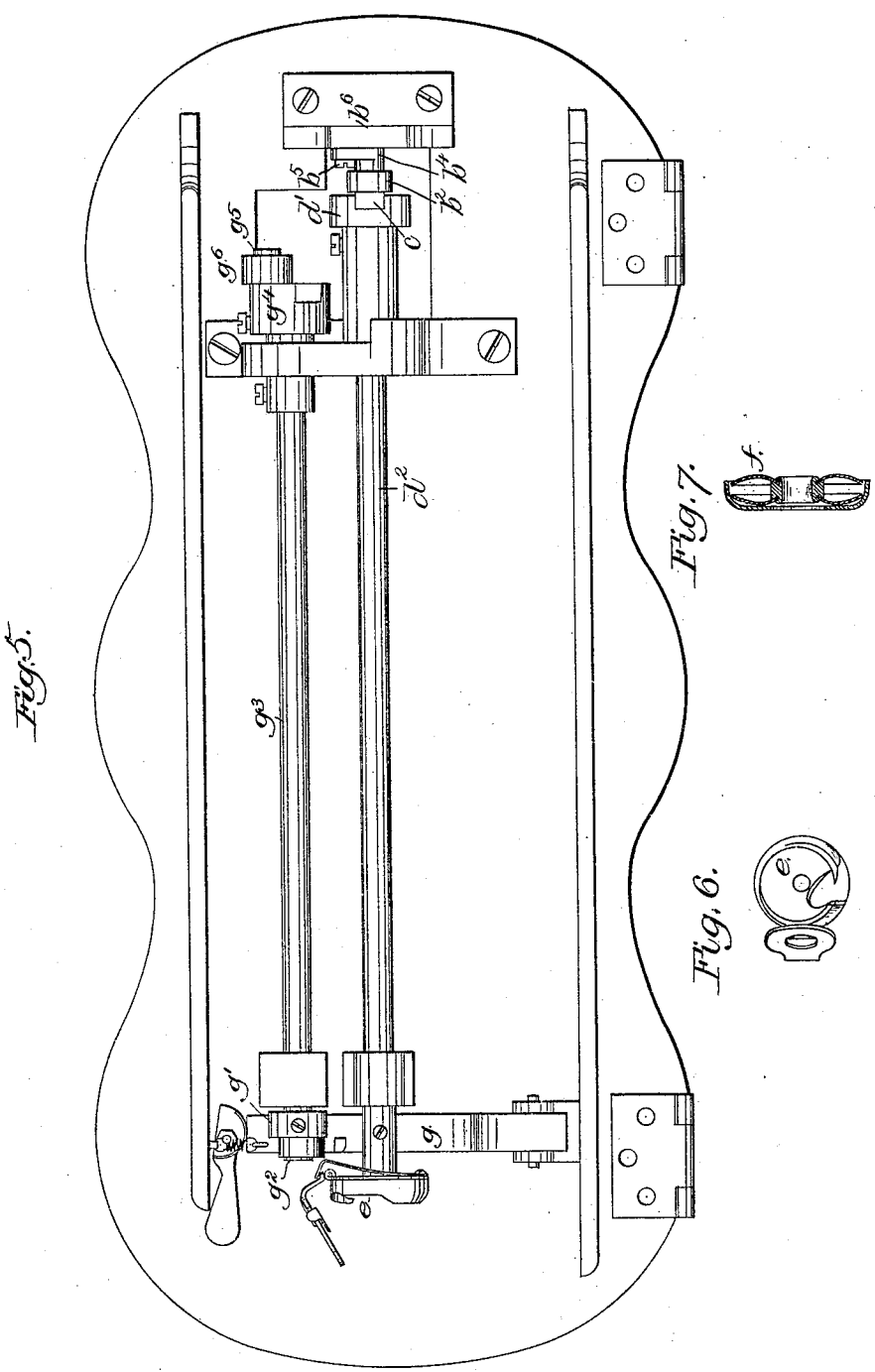
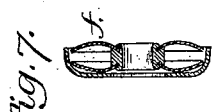
Witnesses.
Fred A. Powell
Inventor:
Eddy T Thomas.
by Crosby & Gregory Attys

UNITED STATES PATENT OFFICE.

EDDY T. THOMAS, OF NEW YORK, N. Y.

SEWING-MACHINE.

SPECIFICATION forming part of Letters Patent No. 277,084, dated May 8, 1883.

Application filed February 19, 1883. (No model.)

*To all whom it may concern:*

Be it known that I, EDDY T. THOMAS, of New York, county of New York, and State of New York, have invented an Improvement in Sewing-Machines, of which the following description, in connection with the accompanying drawings, is a specification, like letters on the drawings representing like parts.

This invention in sewing-machines has for its object improvements in means for oscillating from the rotating upper or needle-bar-operating shaft the under shaft that moves the hook or loop-taker which enters and opens the loop of needle-thread.

My invention consists in the combination, with the machine frame or bed, an oscillating shaft under it, a rotating shaft to operate the needle-bar and a crank or eccentric thereon, and its connecting-rod, of a radius-bar joined with the said connecting-rod, the radius-bar having its fulcrum set at one side of the center of the said oscillating shaft, and having a pin or slide-block to engage a disk or arm secured to the latter shaft, whereby the under shaft is oscillated sufficiently from the rotating needle-bar-actuating shaft to enable the hook or loop-taker attached to the oscillating shaft to enter and open the loop of needle-thread and insure the passage through it of the under or second thread.

Figure 1 represents, in side elevation, a sufficient portion of a sewing-machine to illustrate my present improvement; Fig. 2, a partial front elevation thereof; Fig. 3, a vertical section on the line $x$ $x$, Fig. 1; Fig. 4, a detail of the disk at the end of the oscillating shaft, and the slide-block therein, on the pin of the radius-bar, to be referred to. Fig. 5 is an under side view of Fig. 1; Fig. 6, a detail of the hook or loop-taker for the under thread, and Fig. 7 the disk-bobbin to be used therein.

In the drawings, A represents the overhanging arm, A' the bed-plate, B the rotating needle-bar-operating shaft, and $b'$ the crank thereon, all of usual construction. The front end of the shaft B will in practice have preferably a disk with a crank-pin, and the latter will be joined by a link to a pin on the needle-bar $a$, carrying the needle $a'$, all in usual manner. The crank $b'$, or it might be an eccentric, is joined by the connecting-rod $b^2$ with a pin, $b^3$, on a radius-bar, $b^4$, having its fulcrum $b^5$ set at one side of the center of the oscillating shaft $d^2$, as in Fig. 3, and secured to the hanger $b^6$. The shaft $d^2$, at its rear end, has a disk or arm, $d'$, slotted, as at $d$, to receive a block, $c$, loose upon the pin $b^3$; or the said pin might be inserted directly in the said slot, the latter being of course made of the proper size. As the radius-bar is moved by the connecting-rod the pin $b^3$ and block $c$, by their action on the disk or arm $d'$, cause the shaft $d^2$ to be oscillated sufficiently to move the point and then the body of the hook or loop-taker $e$ for the under thread into the loop of needle-thread far enough to effect the passage of the bobbin containing the under or second thread through the loop of needle-thread and form the well-known lock-stitch, the extent of oscillation of the said shaft being necessarily over one hundred and eighty degrees in order to enable the stitch to be made; and the devices herein described are especially designed and arranged to produce a movement of oscillation in a shaft in excess of one hundred and eighty degrees of a circle, which could not be done if the radius-bar were pivoted to the frame of the machine and to the connecting-rod above the center of the shaft $d^2$, or above the point of connection of the connecting-rod with the pin carried by the radius-bar. The under or second thread, as herein shown, is contained on the disk-bobbin $f$, shown in Fig. 7 as removed from the hook or loop-taker $e$, which enters the loop in the thread carried by the eye-pointed needle $a'$, and spreads the said loop and effects the passage through it of the bobbin containing the under or second thread. In this instance of my invention the device $e$ is shown as a hook of the Wheeler & Wilson class; but I might connect with the said shaft $d^2$ a shuttle-carrier to receive and actuate an oscillating shuttle such as shown in another application, No. 85,309, made by me, and filed February 16, 1883. The feeding device $g$ is moved by the cams $g'$ $g^2$ on the rotating shaft $g^3$, having at its rear end the slotted disk $g^4$, which receives the loose block 3 on the pin $g^5$, attached to the lower end of the lever $g^6$, slotted centrally, placed on the fulcrum $h$, and connected at its upper end with the eccentric $h^2$ on the shaft B.

I do not herein specifically claim the oscillating hook $e$ or the hinged arm to hold the bobbin in place, as that will form the subject of another application by another person.

I claim—

1. In a sewing-machine, the machine frame or bed, the oscillating shaft $d^2$ under it, and its disk or arm, and the rotating needle-bar-operating shaft, and connecting-rod actuated by it, combined with the attached radius-bar having its fulcrum set at one side of the center of the shaft $d^2$, and having a pin or block engaged with the disk or arm on the shaft $d^2$, the parts being arranged with relation to each other as shown, to enable the said shaft to be rotated for more than one hundred and eighty degrees, substantially as set forth.

2. In a sewing-machine, the feeding device, the rotating shaft B, its eccentric and crank, the lever provided with the pin or block, the shaft $g^3$, having a disk or arm, $g^4$, and rotated by its connection with the said lever, combined with the shaft $d^2$ and its disk or arm $d'$, and the connecting-rod $b^2$, its attached radius-bar, having its fulcrum at one side the center of the shaft $d^2$, and a pin or slide-block to engage the arm $d'$ and oscillate the said shaft $d^2$ and the devices carried by it, to co-operate with the needle in the formation of the stitch, substantially as set forth.

In testimony whereof I have signed my name to this specification in the presence of two subscribing witnesses.

EDDY T. THOMAS.

Witnesses:
ALLEN SCHENCK,
BERNICE J. NOYES.